(12) United States Patent
Knight et al.

(10) Patent No.: US 6,516,710 B1
(45) Date of Patent: Feb. 11, 2003

(54) APPARATUS FOR PREPARING MASA FLOUR FROM DRY MILLED MAIZE

(75) Inventors: Peter Knight, Eastgate (GB); Simon Clack, Eastgate (GB); Robert Craddock, Eastgate (GB)

(73) Assignee: Northern Foods Grocery Group Limited (GB)

( * ) Notice: Subject to any disclaimer, the term of this patent is extended or adjusted under 35 U.S.C. 154(b) by 0 days.

(21) Appl. No.: 09/638,605

(22) Filed: Aug. 15, 2000

(30) Foreign Application Priority Data

Aug. 18, 1999 (GB) ............................................. 9919395
May 17, 2000 (GB) ............................................. 0011835

(51) Int. Cl.[7] ............................................. A47J 43/04
(52) U.S. Cl. .......................... 99/348; 99/443 R; 99/471; 99/477; 99/483; 99/516; 99/366; 99/133; 99/147; 99/195; 99/165; 99/109.1
(58) Field of Search .......................... 99/348, 516, 483, 99/443 R, 443 C, 471, 477; 366/133, 144, 147, 149, 186, 312, 194–196; 165/109.1, 87

(56) References Cited

U.S. PATENT DOCUMENTS

| | | | | |
|---|---|---|---|---|
| 393,023 A | * | 11/1888 | Nagel et al. | |
| 1,607,345 A | * | 11/1926 | Harding et al. | |
| 1,706,291 A | * | 3/1929 | Hayes | |
| 3,672,294 A | * | 6/1972 | Blixrud | 99/237 R |

FOREIGN PATENT DOCUMENTS

WO   WO 00/10407   3/2000

* cited by examiner

Primary Examiner—Keith Hendricks
Assistant Examiner—Drew Becker
(74) Attorney, Agent, or Firm—Patzik, Frank & Samotny Ltd.

(57) ABSTRACT

The invention relates to an improved process for preparing Masa flour from dry milled maize comprising direct steam treating of the Masa meal, and also relates to a vertical cooking vessel suitable for (but not limited to) carrying out the steam treatment with improved product consistency.

24 Claims, 2 Drawing Sheets

APPARATUS FOR PREPARING MASA FLOUR FROM DRY MILLED MAIZE

FIELD OF THE INVENTION

The present invention relates to a process for preparing Masa flour from dry milled maize and to a novel device suitable for (but not limited to) carrying out certain steps in the process.

BACKGROUND OF THE INVENTION

Masa dough is traditionally manufactured by steeping whole grain maize in hot water in the presence of a low percentage of added lime (calcium hydroxide). The resultant softened kernels are milled down to form a dough from which tortilla (corn chips) can be sheeted and fried. The precise degree of gelatinisation of the starch within the grain is important in achieving a coherent dough and the addition of lime contributes to the flavour and texture of the corn chip.

The traditional process is known technically as nixtamilisation and has two inherent drawbacks for widespread commercial use. Firstly, the process generates substantial volumes of liquid effluent containing between 2 and 6% dissolved and suspended solids. Secondly, the Masa dough has to be used immediately to avoid deterioration and mould growth. Consequently, the dough has to be dried and ground down to a meal in order to facilitate off-site distribution to customers. This is an inefficient, energy intensive process which is reflected in the cost of the final product. Although various extrusion techniques have been described, none have yet yielded products which match the flavour, texture and functionality of the products of traditional nixtamilisation.

Most modern snack factories in Europe use dry Masa flour as a raw material. Masa flour imported from the US or South Africa attracts a substantial tariff under the European CAP regime and consequently represents an expensive raw material for the European snack food manufacturer in comparison to native cereals. There is an incentive for the European maize miller to develop a process that uses indigenous varieties of maize.

Thus there is a need for an improved commercial process which is versatile in the sense that it can be used with a variety of maize types. The present invention seeks to fulfil this need by replacing the steeping of whole grain with continuous counter-current cooking of dry milled maize meal with live steam.

BRIEF SUMMARY OF THE INVENTION

Thus viewed from one aspect the present invention provides a process for preparing Masa flour from maize comprising:
 dry milling the maize to obtain a dry milled maize meal;
 blending the dry milled maize meal with hot water and lime to obtain a blended meal;
 exposing the blended meal to live steam in a heated cooking vessel; and
 drying and cooling the steam-treated, blended meal.

The term "live steam" is used herein to describe direct contact of steam with the blended meal (ie in comparison to indirect contact where steam heats a cooking vessel or heat exchanger which is in contact with the blended meal).

The versatility of the invention is such that dry milling may be advantageously carried out on a variety of types of grain and irrespective of the precise flow of the dry milling equipment.

BRIEF DESCRIPTION OF THE DRAWINGS

The present invention will now be described in a non-limitative sense with reference to the following example and accompanying Figures in which.

DETAILED DESCRIPTION OF THE INVENTION

Figure 1:
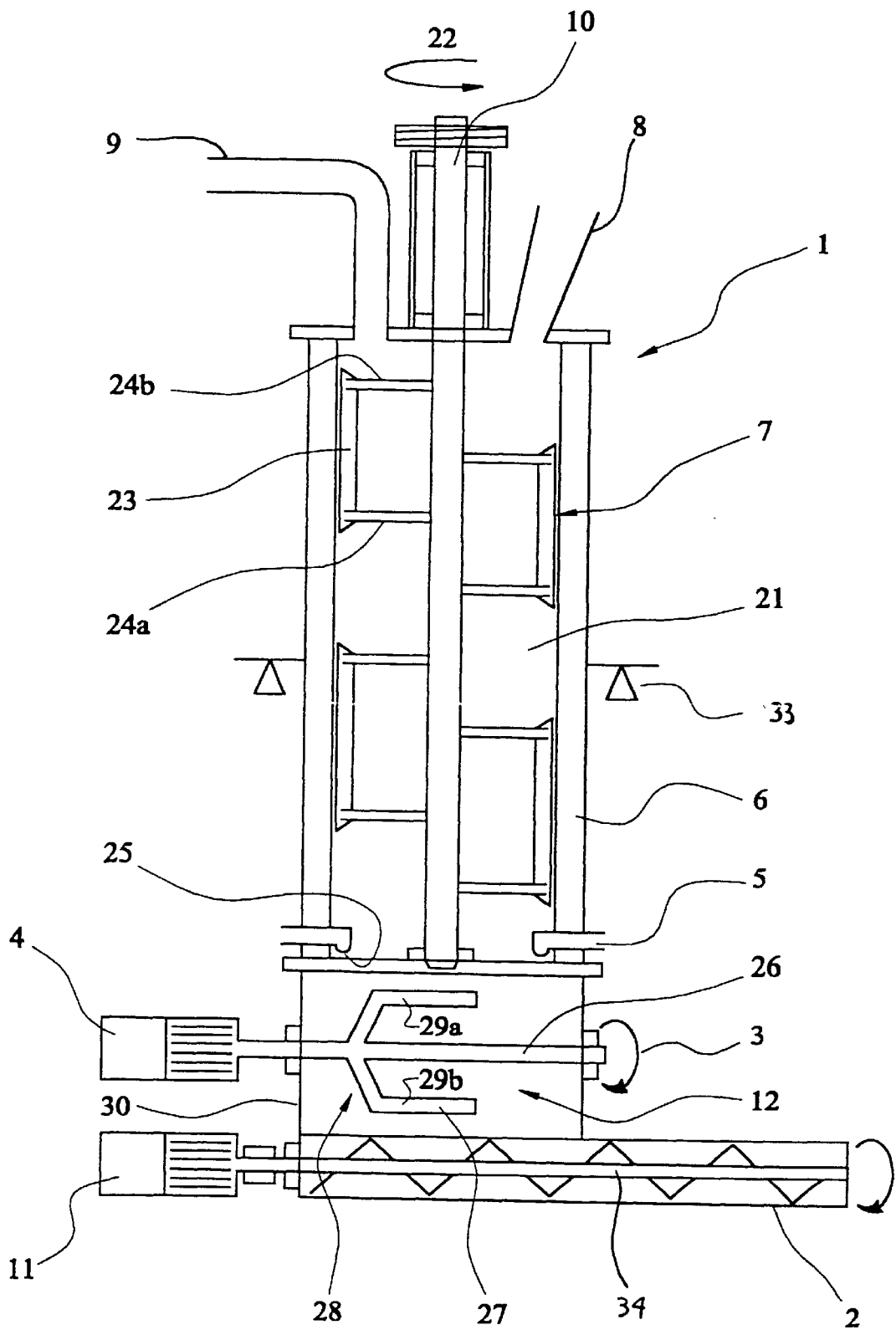
FIG. 1 illustrates a vertical cooking vessel in accordance with an embodiment of the invention for carrying out the cooking step of an embodiment of the process of the invention.

In a preferred embodiment, dry milling comprises the step of tempering maize kernels with warm water (e.g. approximately 3 wt % of warm water). Preferably, the grain is left to stand for about 30 minutes before degerming and size grinding. Size grinding may be conveniently carried out by passing through a series of roller mills and plansifters. This allows the miller to control the yield of fractions (e.g. Coarse and Fine Grits, Polentas and Flour) within limits determined by the type of maize and sophistication of the mill. Smaller bran particles may be removed by air currents in a purifier machine. Preferably, the fractions are recombined into a dry milled maize meal by mixing to a precise degree of granularity and bran content desired for the final food product (e.g. corn chip). The texture and cooking characteristics of the Masa flour can be adjusted by varying the granularity of the dry milled maize meal.

Typically, the dry milled maize meal has a moisture content of about 14.5 wt % and is further processed in this form.

The treatment of the dry milled maize meal prior to exposure to live steam determines both the processing and flavour characteristics of the end product. In a preferred embodiment of the process of the invention, the dry milled maize meal is blended with hot water at an elevated temperature (e.g. in the range 70–95° C., for example 80° C.) to ensure that the desired degree of starch gelatinisation occurs during subsequent cooking. Typically, the dry milled maize meal is blended with water to obtain a blended meal with a moisture content of up to 30 wt %. Powdered lime (anhydrous calcium hydroxide) may be added to the dry milled maize meal prior to cooking to give traditional flavour development. For example, the powdered lime may be added in an amount in the range 0.1–0.5 wt %. Typically 0.1 wt % lime powder is added to achieve the characteristic Masa flavour.

In a preferred embodiment of the process of the invention, the moisture content of the blended meal is raised to 33–35 wt % during exposure to live steam. Preferably, the meal is repeatedly exposed to controlled pulses of live steam. The precise amplitude of the pulses of live steam will contribute to the final outlet temperature of the meal and consequently the degree of gelatinisation. Typically, the live steam is applied at an elevated pressure such as at a pressure in the range 4–8 bar (e.g. at 80 psi (6 bar)).

In a preferred embodiment of the process of the invention, the step of drying the steam-treated, blended (cooked) meal comprises hot air flash drying. This typically reduces the moisture content to about 15 wt %. Preferably, steam-treated, blended (cooked) meal is fed into a venturi at the base of a drying lift by means of a short screw conveyor. Air in the lift may be heated indirectly by means of steam radiators and the product may be collected in a bag filter at the top of the lift pipe. Preferably, the discharge assembly of the bag filter comprises an active vertical spindle (e.g. a flat bottomed vessel with a sweep arm arrangement to feed the product into the discharge spout).

The structure and integrity of a finished product (e.g. corn chips) will vary with the moisture content and particle size of the flour. Both factors have an influence on fat pick-up and product blistering during the frying stage so that, although hot air flash drying produces a reduced level of moisture and improvements in terms of flow characteristics, this may not be satisfactory to certain customers. Thus, in a preferred embodiment of the process of the invention, drying may be conducted by direct evaporation. For example, direct evaporation may be carried out using a steam jacketed screw conveyor from which evaporated moisture may be drawn out by means of gentle exhaust means (e.g. exhaust generated by an air bleed from the main flash dryer bag filter). Residence time in the drying conveyor may be accurately controlled by the rate of rotation.

In a particularly preferred embodiment of the process of the invention, drying comprises a two stage process of hot air flash drying and direct evaporation as hereinbefore described. As mentioned before, the first stage may reduce the moisture content typically to about 15 wt % and the second stage is capable of reducing the content further to 11 wt %.

In a preferred embodiment, the cooked meal (typically 11 wt % moisture) is cooled by flash cooling. This may be typically carried out in an ambient air cooling duct leading to a bag filter of similar design to that used in product drying. This advantageously brings the temperature down to ambient in order to prevent condensation and subsequent mould growth.

Under certain circumstances, the process of the invention will lead to flour agglomeration. Thus, the process of the invention may require the additional step of milling to achieve the desired specification. For example, the dried flour may be re-dressed through a rotary sieve with a suitably sized mesh screen in place. The throughs from the sieve may be taken directly as product, the overtails fed through a pin milling vertical spindle to reduce the particle size to flour, re-sieved and returned to the product line.

Figure 2A:
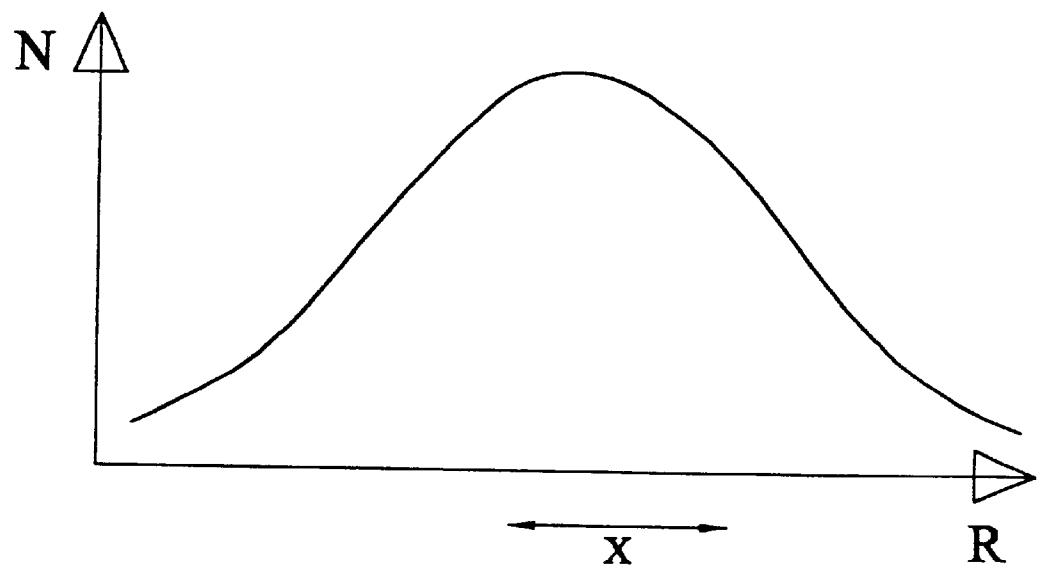
FIG. 2 illustrates schematically the particle distribution (N) of a meal vis a vis residence time (R) in (a) a typical horizontal conveyor cooking vessel of the prior art and (b) the vertical cooking vessel of the invention.
Figure 2B:
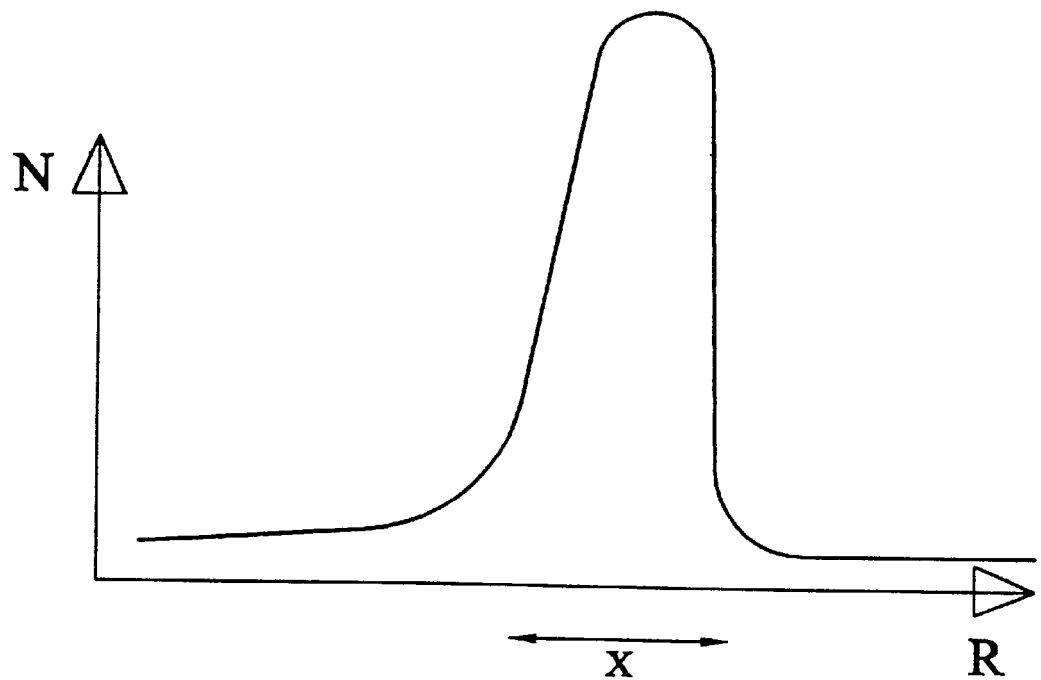

In accordance with the process of the invention, the step of exposing the blended meal to live steam may be carried out in any convenient cooking vessel. Such cooking vessels are familiar to those skilled in the art. One such conventional cooking vessel is based on a horizontal screw conveyor (available from the company Buhler). The residence time of the meal (and consequently the increase in moisture content) in a horizontal screw conveyor is typically controlled by varying the speed of the conveyors. However this technique lacks precision and leads to an unsatisfactory distribution of particles which are exposed to the desired residence time (see FIG. 2). Moreover, horizontal arrangements typified by the Buhler machine have generally unsatisfactory throughput capacity. Although throughput capacity may be improved by extending the length of the conveyor, this is a less than straightforward and expensive task.

The present invention seeks to improve the consistency of a meal (e.g. a dry milled or a blended meal) by providing a vertical cooking vessel for exposing the meal to live steam. More particularly, the vertical cooking vessel takes advantage of gravity to improve throughput capacity and provide more accurate control of residence time.

Viewed from a further aspect the present invention provides a vertical cooking vessel 1 for exposing a particulate material (e.g. a meal) to live steam comprising:
- a vertical chamber having an upper end, a lower end and one or more live steam inlets therebetween;
- an inlet at or near to the upper end of the vertical chamber for feeding particulate material into the vertical chamber;
- a vertical agitator housed within the vertical chamber for assisting uniform flow of the particulate material down the vertical chamber; and
- a discharger connected to the lower end of the vertical chamber.

The vertical cooking vessel of the invention may be used to heat treat any particulate material. The particulate material may be powdered or granular and may be for example a particulate foodstuff material (which may be an edible product for human or non-human animal use or a precursor, component, ingredient or additive thereof). For example, the vertical cooking vessel of the invention may be used to heat treat a blended or non-blended (e.g. a dry milled) meal in the preparation of various types of flour such as for example Masa flour, rice flour, wheat flour or corn flour.

In accordance with the invention, the particulate material (e.g. meal) may be fed through the inlet 8 into the vertical chamber 21 with continuous agitation to ensure a plug flow down the vertical chamber 21 without an external force being applied. Typically, this arrangement allows a throughput capacity of about 1.75 to 2 tonnes per hour and a discharge of good consistency. However, the capacity of the vertical cooking vessel 1 is directly related to the total volume of the vertical chamber 21 integrated with the speed of discharge and the construction of large vertical chambers is relatively straightforward by scaling up the design.

Preferably the vertical chamber 21 is substantially cylindrical. The inlet 8 at the upper end of the vertical chamber 21 may be connected to an input discharger.

Preferably, an integral steam jacket 6 encapsulates the exterior surface of the vertical chamber 21 to maintain the internal temperature at the desired cooking temperature. The integral steam jacket 6 will typically be at a higher temperature than the cooking temperature inside the cooking vessel 1. Typically the cooking temperature can be controlled to within 5° C. of the desired cooking temperature.

In accordance with the invention, live steam inlets 5 are preferably located at or near to the lower end of the vertical chamber 21. For example, the vertical cooking vessel 1 may comprise injection means at or near to the lower end of the vertical chamber 21 for applying controlled pulses of steam. Preferably the injection means comprises a downwardly dependent nozzle 25. This advantageously minimises the risk of downward flowing particulate material (e.g. meal) being trapped in the nozzle 25. The injection means may be valve controlled.

As the particulate material (e.g. meal) passes down the vertical chamber 21, it is cooked by steam rising up through it. The residence time in the vertical cooking vessel 1 will be generally sufficient for the majority of steam injected into the lower end of the vertical cooking vessel 1 to be absorbed. A residence time typically in the range 7–15 minutes (e.g. about seven minutes) is desirable but will need to be varied according to the characteristics of the particulate material (e.g. meal).

In order to achieve a desired residence time, the vertical cooking vessel 1 preferably comprises means for controlling the rate of flow of the particulate material (e.g. meal). Particularly preferably the vertical cooking vessel 1 comprises means for controlling the rate of discharge from the discharger 2.

The means for controlling the rate of flow of the particulate material (e.g. meal) may be computer driven. For example, a single computer interface may be used to control one or more of the rate of flow (e.g. rate of discharge), the steam pulsing, the cooking temperature, the temperature of the steam jacket 6, the input weight, etc.

Preferably the means for controlling the rate of flow of the particulate material (e.g. meal) is advantageously adapted to integrate the weight of particulate material (e.g. meal) in the vertical chamber 21 with the rate of discharge from the discharger 2. By way of example, if the weight of particulate material (e.g. meal) falls below a predetermined threshold specific the desired residence time, the rate of discharge may be reduced. Conversely if the weight of particulate material (e.g. meal) rises above a predetermined threshold specific to the desired residence time, the rate of discharge may be increased. Preferably the vertical cooking vessel 1 comprises one or more load cells 33 on the mounting points of the vertical chamber 21 for measuring the weight of particulate material (e.g. meal) in the vertical chamber 21.

The vertical cooking vessel 1 of the invention may comprise feeding means at or near to the upper end of the vertical chamber 21 for feeding blending components to the particulate material (e.g. meal) prior to cooking. For example, the vertical cooking vessel may comprise a lime feeder for feeding lime to a meal if it is desired to prepare Masa flour.

In general, the internal components of the vertical cooking vessel 1 of the invention are tailored so as to advantageously minimise blocking and maintain a uniform flow to achieve consistent characteristics in the discharge and the final product (e.g. the Masa flour).

Preferably the vertical agitator comprises a vertical spindle 10 and one or more (preferably a plurality) of stirring means 7 and is housed within the vertical chamber 21 to provide continuous agitation to the particulate material (e.g. meal). The upper end of the vertical spindle 10 may extend beyond the upper end of the vertical chamber 21 and be connected to a means for effecting rotation 22 (e.g. a conventional motor). A gentle stirring action may be effected to prevent clumping during cooking and ensure a plug flow down the vertical chamber 21.

Preferably a plurality of stirring means 7 are arranged along the length of the vertical spindle 10 in substantially the same vertical plane.

Preferably each stirring means 7 is offset along the length of the vertical spindle 10 such that the axis of each lies in a different transverse plane of the vertical spindle 10. Preferably there are a sufficient number of offset stirring means 7 to sweep substantially the whole interior volume of the vertical chamber 21 which optimises flow through and clearance of particulate material (e.g. meal) from the wall.

Preferably one or more pairs of stirring means 7 are substantially diametrically disposed in the interior of the vertical chamber 21. Preferably each one of the pair is offset along the length of the vertical spindle 10 and there are a sufficient number of pairs to sweep substantially the whole interior volume of the vertical chamber 21 which optimises flow through and clearance of particulate material (e.g. meal) from the wall.

In a preferred embodiment, each stirring means 7 comprises at least two parallel blades 24a, 24b connected at one end by a flat scraper 23. Preferably the parallel blades 24a, 24b have a trapezoidal (e.g. diamond-shaped) cross-section and each is arranged along the vertical spindle 10 such that a sharp edge of the blade points uppermost. This advantageously prevents particulate material (e.g. meal) being trapped on the exposed upper surface of the blade and allows the blade to cut into the particulate material (e.g. meal) as it passes down the vertical chamber 21.

Preferably the flat scraper 23 is disposed substantially parallel to the vertical spindle 10. Preferably the flat scraper 23 is connected to the parallel blades 24a, 24b so that it passes as close as possible to the internal surface of the vertical chamber 21 (and thereby removes any particulate material (e.g. meal) lodged on the internal face)

The steam-treated meal generally has unsatisfactory flow properties at the lower end of the vertical chamber 21 after cooking. For this reason, a horizontal agitator 27 is connected to the lower end of the vertical chamber 21 to break up the particulate material (e.g. meal) before it enters the discharger 2. For example, the horizontal agitator 12 may be an active bridge breaker immediately above the discharge screw 2.

In an embodiment of the invention, the horizontal agitator 12 comprises a horizontal spindle 26 connected to one or more (preferably two) stirring arms 29a, 29b. Preferably the stirring arms 29a, 29b and the horizontal spindle 26 are arranged in substantially the same axial plane. Preferably the horizontal arms 29a,29b are axially symmetrically disposed about the horizontal spindle 26 which minimises interruption of the particulate material (e.g. meal) flow.

Preferably each horizontal arm 29a,29b comprises a first angled portion 28 dependent from the horizontal spindle 26 to which is connected a second portion 27 parallel to the axis of the spindle 26. Preferably the second portion 27 is a blade arranged so that a sharp edge points uppermost. This advantageously prevents particulate material (e.g. meal) being trapped on the exposed upper surface of the second portion 27 and allows the blade to cut into the particulate material (e.g. meal).

The horizontal agitator 12 may conveniently be housed within a housing 30 which connects the vertical chamber 21 to the discharger 2. An end of the horizontal spindle 26 may extend beyond the housing 30 and be operatively connected to a means for effecting rotation 4 (e.g. a conventional motor).

In an embodiment of the invention, the discharger 2 comprises a discharge screw 34 and a discharge motor 11. In general, the poor flow characteristics of a cooked particulate material (e.g. meal) and the tendency for clumping under compression means that the configuration of the discharge screw 34 is preferably optimised for effective performance. In a preferred embodiment, the discharge screw 34 is constructed as an open spiral helix from an appropriate gauge of stainless steel bar. The discharge screw 34 may be driven (for example using a suitable gearbox) by an electric motor with variable speed control. The speed of discharge and therefore residence time in the vertical chamber 21 may be established as a variable parameter in the control sequence of a computer.

The head space above the particulate material (e.g. meal) may be exhausted by exhaust means 9 at the upper end of the vertical chamber 21 (e.g. a fan and duct to atmosphere). The exhaust 9 prevents the build-up of pressure within the vertical cooking vessel 1 and substantially reduces the potential for mould growth in the vertical cooking vessel 1 and inlet 8 by removing excess moist air.

EXAMPLE 1 a) Milling

The first step of an embodiment of the process of the invention is dry milling of maize kernels using grain imported to the UK from France. This involves tempering the kernels with approximately 3 wt % of warm water, leaving to stand for about half an hour before de-germing on proprietary equipment and size grinding by a sequence of passages through roller mills and plansifters. Smaller bran particles are removed by air currents in purifier machines and the resultant yield of Coarse and Fine Grits, Polentas and Flour can be controlled by the miller within limits determined by the variety of maize being used and the sophistication of the mill. For the manufacture of Masa flour, the fractions may be recombined in a blending process to the precise degree of granularity and bran content required in the finished corn chip. The resultant meal has a moisture content of 14.5 wt % and is fed to the first stage of the cooking process in this form.

b) Blending

Preparation of the meal prior to cooking with live steam determines both the processing and flavour characteristics of the end product. In order that the correct degree of starch gelatinisation occurs during cooking, the meal is first blended with hot water at 80° C. This is sufficient to bring the moisture content to 30 wt %. 0.1 wt % lime powder is added to achieve the characteristic Masa flavour of the final product.

(c) Cooking

With reference to FIG. 1, after the blending step, the hot meal is fed into the upper end of the vertical chamber 21 of a vertical cooking vessel (designated generally by reference numeral 1) through inlet 8. A vertical agitator comprising a vertical spindle 10 and four offset stirring means 7 is housed within the vertical chamber 21 and provides continuous agitation. A conventional motor (not shown) permits rotation 22 of the vertical spindle 10 and a gentle stirring action may be effected to prevent clumping during cooking and ensure a plug flow of meal down the vertical chamber 21. Each stirring means comprises two parallel blades 24a, 24b connected at one end by a flat scraper 23. Each of the parallel blades 24a, 24b has a diamond-shaped cross-section and is arranged such that the tip of the blade points uppermost to prevent meal being trapped on the exposed upper surface of the blade and to allow the blade to cut into the meal as it passes down the vertical chamber 21.

The vertical chamber 21 is surrounded by an integral steam jacket 6 to maintain the internal temperature at about 100° C. Steam at 80 psi (6 bar) is injected through a downwardly dependent nozzle 25 of an injection means 5 into the lower end of the vertical chamber 21 in a series of repeated controlled pulses. The amplitude of the pulses contributes to the final outlet temperature of the meal and consequently the degree of gelatinisation that occurs.

As the meal passes down the column, it is cooked by the steam rising up through the material. The approximate residence time in the cooker is typically 7 minutes during which time the majority of steam injected into the base of the vessel is absorbed by the meal. The moisture level of the cooked product typically reaches 33–35%.

The head space above the meal is exhausted by means of a fan and duct to atmosphere 9. This exhaust prevents the build-up of pressure within the vertical cooking vessel and substantially reduces the potential for mould growth in the vertical chamber 21 and inlet 8 by removing moist air at the end of a product run.

d) Discharge from Cooker

It is important to maintain a uniform product flow down the cooking vessel to achieve consistent characteristics in the finished Masa. The hot moist meal has poor flow properties after cooking and meal flow is achieved by means of a horizontal agitator 12 immediately above the discharger 2. The discharger 2 comprises a discharge screw 34 and discharge motor 11. The horizontal agitator 12 comprises a horizontal spindle 26 connected to two stirring arms 29a, 29b. Each stirring arm 29a, 29b comprises a first angled portion 28 dependent from the horizontal spindle 26 to which is connected a second portion 27 parallel to the axis of the horizontal spindle. The second portion 27 is a blade arranged so that the sharp edge points uppermost. The horizontal agitator is housed within a housing 30 which connects the vertical chamber 21 to the discharger 2. An end of the spindle 26 extends beyond the housing 30 and is connected to a conventional motor 4 which effects rotation 3.

The residence time in the cooker is controlled by integrating the weight of material in the vertical chamber 21 with the rate of discharge from the discharge means under the control of a computer (not shown). The weight of meal in the vertical chamber 21 is measured by load cells 33 on the cooker mounting points. It will be seen from FIG. 2 that the number of particles with the desired range of residence time X is advantageously greater in the vertical cooking vessel 1 of the invention than in a conventional horizontal cooking vessel.

e) Drying

Drying is achieved in a two stage process. A hot air flash dryer is used in the first stage to reduce moisture from 35 wt % to 15 wt %. The hot moist meal is fed into a venturi at the base of the drying lift by means of a short screw conveyor. The air in the lift is heated indirectly by means of steam radiators and the product is collected in a bag filter at the top of the lift pipe. Given the poor flow characteristics of the product, the design of the discharge assembly from the bag filter comprises a flat bottomed vessel with a sweep arm arrangement feeding the product into the discharge spout.

Once the moisture content is reduced to 15 wt %, the flow characteristics improve considerably but the customer may require lower final product moisture. The structure and integrity of finished corn chips will vary with the flow and moisture content and particle size. Both factors have an influence on fat pick up and product blistering during the frying stage.

The second stage of drying reduces the moisture content from 15 to 11 wt % by means of direct evaporation within a steam jacketed screw conveyor. Evaporated moisture is drawn out of the conveyor by means of gentle exhaust generated by an air bleed from the main flash drying bag filter. Residence time in the drying conveyor may be accurately controlled by the speed of rotation and precise targeting of finished product moisture achieved.

f) Cooling

The product at 11 wt % moisture remains close to 85° C. and it is essential to bring the temperature down to ambient in order to prevent condensation and subsequent mould growth. This is achieved by flash cooling in an ambient air cooling duct leading to a bag filter of similar design to the first stage of product drying.

g) Size Grinding

During the cooking and drying process, a certain degree of flour agglomeration will occur and this may need to be milled down to achieve the desired specification. The dried flour is re-dressed through a rotary sieve with a suitably sized mesh screen in place. The throughs from the sieve are taken directly as product, the overtails fed through a pin milling vertical spindle to reduce the particle size to flour, re-sieved and returned to the product line.

What is claimed is:

1. A vertical cooking vessel for exposing particulate material to live steam comprising:

a vertical chamber having an upper end, a lower end and at least one live steam inlet located proximal to the lower end of the vertical chamber;

an inlet located proximal to the upper end of the vertical chamber for feeding particular material into the vertical chamber;

a vertical agitator housed within the vertical chamber for assisting uniform flow of the particulate material down the vertical chamber;

a horizontal agitator connected to the lower end of the vertical chamber for improving the flow properties of the particulate matter upon discharge; and a discharger connected to the lower end of the vertical chamber.

2. The vertical cooking vessel as claimed in claim 1, wherein the vertical chamber is substantially cylindrical.

3. The vertical cooking vessel as claimed in claim 1, wherein an integral steam jacket encapsulates the exterior surface of the vertical chamber to maintain the internal temperature at the desired cooking temperature.

4. The vertical cooking vessel as claim in claim 1, wherein the at least one live steam inlet includes an injection means for applying controlled pulses of steam.

5. The vertical cooking vessel as claimed in claim 4, wherein the injection means includes a downwardly dependent nozzle.

6. The vertical cooking vessel as claimed in claim 1, further comprising means for controlling the rate of flow of the particulate material.

7. The vertical cooking vessel as claimed in claim 6, wherein the means for controlling the rate of flow of the particulate material is adapted to integrate the weight of particulate material in the vertical chamber with the rate of discharge from the discharger.

8. The vertical cooking vessel as claimed in claim 1, further comprising means for controlling the rate of discharge from the discharger.

9. The vertical cooking vessel as claimed in claim 1, further comprising at least one load cell on mounting points of the vertical chamber for measuring the weight of particulate material in the vertical chamber.

10. The vertical cooking vessel as claimed in claim 1, wherein the vertical agitator includes a vertical spindle and at least one stirring means housed within the vertical chamber to provide continuous agitation to the particulate material.

11. The vertical cooking vessel as claimed in claim 10, wherein the vertical agitator further includes a plurality of stirring means arranged along the length of the vertical spindle in substantially the same vertical plane.

12. The vertical cooking vessel as claimed in claim 10, wherein each stirring means is offset along the length of the vertical spindle such that the axis of each lies in a different transverse plane of the vertical spindle.

13. The vertical cooking vessel as claimed in claim 12, wherein there are a sufficient number of offset stirring means to sweep substantially the whole interior volume of the vertical chamber.

14. The vertical cooking vessel as claimed in claim 10, wherein the at least one pair of stirring means are substantially diametrically disposed in the interior of the vertical chamber.

15. The vertical cooking vessel as claimed in claim 10, wherein each stirring means includes at least two parallel blades connected at one end by a flat scraper.

16. The vertical cooking vessel as claimed in claim 15, wherein the parallel blades have a trapezoidal cross-section and each parallel blade is arranged along the vertical spindle such that a sharp edge of the blade points uppermost.

17. The vertical cooking vessel as claimed in claim 15, wherein the flat scraper is disposed substantially parallel to the vertical spindle.

18. The vertical cooking vessel as claimed in claim 15, wherein the flat scraper is connected to the parallel blades so that it passes as close as possible to the internal surface of the vertical chamber.

19. The vertical cooking vessel as claimed in claim 1, wherein the horizontal agitator includes a horizontal spindle connected to at least one stirring arm.

20. The vertical cooking vessel as claimed in claim 19, wherein the at least one stirring arm and the horizontal spindle are arranged in substantially the same axial plane.

21. The vertical cooking vessel as claimed in claim 19, wherein the at least one stirring arm is axially symmetrically disposed about the spindle.

22. The vertical cooking vessel as claimed in claim 19, wherein the at least one stirring arm includes a first angled portion dependent from the horizontal spindle to which is connected a second portion parallel to the axis of the spindle.

23. The vertical cooking vessel as claimed in claim 22, wherein the second portion is a blade arranged so that a sharp edge points uppermost.

24. A vertical cooking vessel for exposing particulate material to live steam comprising a vertical chamber having an upper end, a lower end and at least one live steam inlet therebetween;

an inlet located proximal to the upper end of the vertical chamber for feeding particulate material into the vertical chamber;

a vertical agitator housed within the vertical chamber for assisting uniform flow of the particulate material down the vertical chamber;

a horizontal agitator connected to the lower end of the vertical chamber, wherein the horizontal agitator includes a horizontal spindle connected to at least one stirring arm, and wherein the at least one stirring arm includes a first angled portion dependent from the horizontal spindle to which is connected a second portion parallel to the axis of the spindle; and a discharger connected to the lower end of the vertical chamber.

* * * * *

UNITED STATES PATENT AND TRADEMARK OFFICE
CERTIFICATE OF CORRECTION

PATENT NO. : 6,516,710 B1 Page 1 of 1
DATED : February 11, 2003
INVENTOR(S) : Knight et al.

It is certified that error appears in the above-identified patent and that said Letters Patent is hereby corrected as shown below:

<u>Column 9,</u>
Line 5, replace "particular" with -- particulate --
Line 9, replace "claim" with -- claimed --

Signed and Sealed this

First Day of July, 2003

JAMES E. ROGAN
*Director of the United States Patent and Trademark Office*